(12) United States Patent
Guermoud et al.

(10) Patent No.: US 10,535,124 B2
(45) Date of Patent: Jan. 14, 2020

(54) INVERSE TONE MAPPING METHOD AND CORRESPONDING DEVICE

(71) Applicant: THOMSON LICENSING, Issy les Moulineaux (FR)

(72) Inventors: Hassane Guermoud, Cesson Sévigné (FR); Jonathan Kervec, Paimpont (FR); Laurent Cauvin, Chevaigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 278 days.

(21) Appl. No.: 15/594,283

(22) Filed: May 12, 2017

(65) Prior Publication Data
US 2017/0337670 A1    Nov. 23, 2017

(30) Foreign Application Priority Data

May 23, 2016 (EP) .................................... 16305589

(51) Int. Cl.
*G06K 9/00* (2006.01)
*G06T 5/00* (2006.01)
(Continued)

(52) U.S. Cl.
CPC ............ *G06T 5/009* (2013.01); *G06K 9/4661* (2013.01); *G06K 9/6202* (2013.01);
(Continued)

(58) Field of Classification Search
None
See application file for complete search history.

(56) References Cited

U.S. PATENT DOCUMENTS 8,289,412 B2 * 10/2012 Banterle ................. G06T 5/008
 348/222.1
8,982,963 B2 * 3/2015 Gish ......................... G06T 5/50
 345/590

(Continued)

FOREIGN PATENT DOCUMENTS

WO  WO2015096955           7/2015
WO  WO-2015096955 A1 *    7/2015    ............... H04N 5/57

OTHER PUBLICATIONS

A framework for inverse tone mapping, Francesco Banterle et al., Visual Comput, 10.1007/s00371-007-0124-9, 2007, pp. 467-478 (Year: 2007).*

(Continued)

*Primary Examiner* — Jayesh A Patel
(74) *Attorney, Agent, or Firm* — Brian J. Dorini; Patricia A. Verlangieri

(57) ABSTRACT

The disclosure relates generally to the field of high dynamic range (HDR) imaging and addresses the way of expanding the dynamic range of low dynamic range images. A method having the steps of obtaining expansion exponent map data for each one of a plurality of clusters of reference images, obtaining, for each cluster, one feature, called visual feature, representative of the luminance of reference images of the cluster, obtaining a visual feature for the image, comparing the visual feature of the image with the visual features of the clusters according to a distance criterion, selecting the cluster, the visual feature of which is the closest to the visual feature of the image, and applying an expansion exponent map defined by the expansion exponent map data of the selected cluster to the image is described.

15 Claims, 3 Drawing Sheets

(51) Int. Cl.
*G06K 9/46* (2006.01)
*G06K 9/62* (2006.01)
*G06T 5/20* (2006.01)
*G06T 5/40* (2006.01)

(52) U.S. Cl.
CPC .............. *G06K 9/6218* (2013.01); *G06T 5/20* (2013.01); *G06T 5/40* (2013.01); *G06T 2207/20208* (2013.01)

(56) References Cited

U.S. PATENT DOCUMENTS

| | | | | |
|---|---|---|---|---|
| 9,076,224 | B1* | 7/2015 | Shah | G06T 5/009 |
| 9,338,475 | B2* | 5/2016 | Chiu | H04N 19/46 |
| 9,911,181 | B2* | 3/2018 | Pouli | H04N 5/57 |
| 10,013,745 | B2* | 7/2018 | Chamaret | G06T 5/007 |
| 10,043,251 | B2* | 8/2018 | Huang | G06T 5/20 |
| 2002/0159749 | A1* | 10/2002 | Kobilansky | G06T 7/20 |
| | | | | 382/254 |
| 2007/0025617 | A1* | 2/2007 | Dai | G06K 9/00456 |
| | | | | 382/180 |
| 2007/0201560 | A1* | 8/2007 | Segall | H04N 19/61 |
| | | | | 375/240.24 |
| 2008/0137976 | A1* | 6/2008 | Ward | H04N 19/30 |
| | | | | 382/254 |
| 2009/0041349 | A1* | 2/2009 | Suzuki | G06T 7/44 |
| | | | | 382/168 |
| 2010/0079666 | A1* | 4/2010 | Osanai | G06T 3/40 |
| | | | | 348/441 |
| 2011/0194618 | A1* | 8/2011 | Gish | G06T 5/50 |
| | | | | 375/240.25 |
| 2012/0201456 | A1* | 8/2012 | El-Mahdy | G06T 5/009 |
| | | | | 382/167 |
| 2012/0288015 | A1* | 11/2012 | Zhang | H04N 7/54 |
| | | | | 375/240.26 |
| 2013/0287296 | A1* | 10/2013 | Li | H04N 5/2355 |
| | | | | 382/167 |
| 2014/0029675 | A1* | 1/2014 | Su | H04N 19/105 |
| | | | | 375/240.16 |
| 2015/0302551 | A1* | 10/2015 | Huang | G06T 3/0012 |
| | | | | 382/199 |
| 2015/0356904 | A1* | 12/2015 | Nakatani | G09G 5/377 |
| | | | | 345/690 |
| 2016/0358319 | A1* | 12/2016 | Xu | H04N 1/4072 |
| 2017/0061590 | A1* | 3/2017 | Chamaret | G06T 5/007 |
| 2017/0228854 | A1* | 8/2017 | Cauvin | G06T 5/002 |
| 2018/0232867 | A1* | 8/2018 | Park | G06T 5/00 |
| 2019/0147572 | A1* | 5/2019 | Colaitis | G06T 5/009 |
| | | | | 345/589 |

OTHER PUBLICATIONS

Evaluation of reverse Tone mapping—Conditions, Belen Masia et al., ACM 0730-0301, 2009, pp. 160:1-160:8 (Year: 2009).*
Zhuang et al., "Gaussian Mixture Density Modeling, Decomposition, and Applications", IEEE Transactions on Image Processing, vol. 5, No. 9, Sep. 1996, pp. 1293-1302.
Narasimha et al., "Example-Based Brightness and Contrast Enhancement", 2013 IEEE International Conference on Acoustics, Speech and Signal Processing (ICASSP), Vancouver, British Columbia, Canada, May 26, 2013, pp. 2459-2463.
Jang et al., "Content Dependent Contrast Enhancement for Displays based on Cumulative Distribution Function", Color Imaging XVIII: Displaying, Processing, Hardcopy, and Applications, SPIE vol. 8652, Feb. 4, 2013, pp. 1-7.

* cited by examiner

INVERSE TONE MAPPING METHOD AND CORRESPONDING DEVICE

1. REFERENCE TO RELATED EUROPEAN APPLICATION

This application claims priority from European Patent Application No. 16305589.0, entitled "INVERSE TONE MAPPING METHOD AND CORRESPONDING DEVICE", filed on May 23, 2016, the contents of which are hereby incorporated by reference in its entirety.

2. TECHNICAL FIELD

The present invention relates generally to the field of high dynamic range imaging and addresses the way of expanding the dynamic range of low dynamic range images.

3. BACKGROUND ART

Recent advancements in display technology are beginning to allow for an extended range of color, luminance and contrast to be displayed.

Technologies allowing for extensions in luminance or brightness range of image content are known as high dynamic range imaging, often shortened to HDR. HDR technologies focus on capturing, processing and displaying content of a wider dynamic range.

Although a number of HDR display devices have appeared, and image cameras capable of capturing images with an increased dynamic range are being developed, there is still very limited HDR content available. While recent developments promise native capture of HDR content in the near future, they do not address existing content.

To prepare conventional (hereon referred to as SDR for Standard dynamic range) content for HDR display devices, reverse or inverse tone mapping operators (iTMO) can be employed. Such algorithms process the luminance information of colors in the image content with the aim of recovering or recreating the appearance of the original scene.

Different kinds of inverse tone mapping algorithms exist, as for instance local tone mapping algorithms and global tone mapping algorithms. For example, in the field of local tone mapping algorithms, the patent application WO2015/096955 discloses a method comprising, for each pixel p of the image, the steps of obtaining a pixel expansion exponent value E(p) and then inverse tone mapping the luminance Y(p) according to the equation $$Y_{exp}(p) = Y(p)^{E(p)} \quad (1)$$

wherein $Y_{exp}(p)$ is the expanded luminance value of the pixel p.

The set of values E(p) for all pixels of an image form the expansion exponent map for this image. The expansion exponent maps can be generated by different methods, for example by low-pass filtering.

Dedicated tools have been developed to implement inverse tone mapping methods to SDR images. These tools can be used either as a plugin within a post-production tool to help colorists for manual grading, or as hardware implementation within a SoC (System On Chip) for a set-top box or TV set. In the first case, the images are manually processed by colorists. The process gives good results (the artistic intent of the film makers can be preserved) but cannot be performed on the fly. In the latter case, predetermined expansion parameters are applied to the video sequences without any adaptation to the video content and without the intervention of colorists. The inverse tone mapping can thus be performed on the fly. But the results are not so good as those issued from a manual grading of colorists.

There is a need to set a global tone mapping algorithm that can adapt automatically to the content to tone-map.

4. SUMMARY OF INVENTION

It is an object of the invention to propose a method for inverse tone mapping that can be applied to video sequences on the fly and A subject of the invention is a method for inverse tone mapping of an image, comprising the steps of:
  obtaining expansion exponent map data for each one of at least two clusters of reference images,
  obtaining, for each of said at least two clusters, one feature, called visual feature, representative of the luminance of reference images of the cluster,
  obtaining a visual feature for said image,
  comparing the visual feature of said image with the visual features of said at least two clusters according to a distance criterion,
  selecting, among said at least two clusters, the cluster, the visual feature of which is the closest to the visual feature of said image, and
  applying an expansion exponent map defined by the expansion exponent map data of the selected cluster to said image.

The two first steps are performed during a preliminary phase which is a training phase and the other steps are performed in a subsequent phase.

The training phase is performed offline. During this phase, expansion exponent map data and visual features are obtained for each cluster comprising reference images. The expansion exponent map data are extracted from a ground-truth delivered by colorists.

In a particular embodiment, the expansion exponent map data for a cluster are generated based on reference expansion exponent map data of the reference images of the cluster. These reference expansion exponent map data are preferably generated by colorists.

In a particular embodiment, the expansion exponent map is defined by parameters associated to a quadratic function. The expansion exponent map data are the parameters of said quadratic function. In this embodiment, the quadratic function parameters of the expansion exponent map of a cluster are obtained by:
  obtaining the quadratic function parameters of the expansion exponent map of each reference image of the cluster,
  sorting the quadratic function parameters of the expansion exponent maps of the reference images of the cluster in ascending or descending order, and
  selecting the median values of the sorted quadratic function parameters as parameters of the quadratic function of the expansion exponent map of the cluster.

In a specific embodiment, the quadratic function is defined by the relation:

$$E(p) = a[Y_{base}(p)]^2 + b[Y_{base}(p)] + c$$

where: $Y_{base}(p)$ is a low-filtered luminance value of a pixel p of an image and a, b, and c are the parameters of the quadratic function.

In a particular embodiment, the visual feature for a cluster is generated based on visual features of the reference images of the cluster.

In a specific embodiment, the visual feature of a reference image or image is the histogram of the luminance levels of the pixels of said reference image or image.

In another embodiment, the luminance range of an image being divided in at least three consecutive luminance portions, the visual feature of said image comprises Gaussian function parameters defining at least three Gaussian functions approximating the histogram of the luminance levels of the pixels of said image in said at least three consecutive luminance portions respectively.

In this embodiment, the Gaussian function parameters of the visual feature of a cluster are obtained by:
  obtaining the Gaussian function parameters of the visual feature of each reference image of the cluster,
  sorting the Gaussian function parameters of the visual features of the reference images of the cluster in ascending or descending order, and
  selecting the median values of the sorted Gaussian function parameters as parameters of the Gaussian function of the visual feature of the cluster.

In this embodiment, the visual feature of an image is compared with the visual feature of a cluster by comparing their Gaussian function parameters.

Another subject of the invention is an image processing device comprising:
  a memory for storing, for each one of at least two clusters of reference images, expansion exponent map data and a feature, called visual feature, representative of the luminance of reference images of the cluster,
  a pre-processor that obtains an image and a visual feature for said image,
  a comparator for comparing the visual feature of said image with the visual features of said at least two clusters according to a distance criterion, and selecting, among said at least two clusters, the cluster, the visual feature of which is the closest to the visual feature of said image,
  an inverse tone mapper for applying the expansion exponent map defined by expansion exponent map data of the selected cluster to said image.

In a particular embodiment, the expansion exponent map is defined by parameters associated to a quadratic function. The stored expansion exponent map data are the parameters of said quadratic function.

In a specific embodiment, the quadratic function is defined by the relation:

$$E(p)=a[Y_{base}(p)]^2+b[Y_{base}(p)]+c$$

where: $Y_{base}(p)$ is a low-filtered luminance value of a pixel p of an image and a, b, and c are the parameters of the quadratic function.

The stored expansion exponent map data are the parameters a, b and c.

In a specific embodiment, the visual feature of an image is the histogram of the luminance levels of the pixels of said image and the comparator compares the histogram of the image with the histograms of the clusters.

In another embodiment, the luminance range of an image being divided in at least three consecutive luminance portions, the visual feature of said image comprises Gaussian function parameters defining at least three Gaussian functions approximating the histogram of the luminance levels of the pixels of said image in said at least three consecutive luminance portions respectively.

In this embodiment, the comparator compares the visual feature of an image with the visual feature of a cluster by comparing their Gaussian function parameters.

In a particular embodiment, the pre-processor is adapted to obtain a video sequence comprising a plurality of video shots, each video shot comprising at least one image. In that case, the image processing device preferably further comprises:
  a cut detection circuit for detecting video shots in the video sequence,
  a selector for selecting one image in at least one shot of the video sequence,
  said selected image being used by the pre-processor, the comparator and the first selector for selecting, among said at least two clusters, the cluster, the expansion exponent map of which is to be applied by the inverse tone mapper to the images of the shot to which said selected image belongs.

5. BRIEF DESCRIPTION OF THE DRAWINGS

The invention can be better understood with reference to the following description and drawings, given by way of example and not limiting the scope of protection, and in which.

6. DESCRIPTION OF EMBODIMENTS

The functions of the various elements shown in the figures may be provided through the use of dedicated hardware as well as hardware capable of executing software in association with appropriate software.

It is to be understood that the invention may be implemented in various forms of hardware, software, firmware, special purpose processors, or combinations thereof. The term "processor" should not be construed to refer exclusively to hardware capable of executing software, and may implicitly include, without limitation, digital signal processor ("DSP") hardware, read-only memory ("ROM") for storing software, random access memory ("RAM"), and non-volatile storage. The invention may be notably implemented as a combination of hardware and software. Moreover, the software may be implemented as an application program tangibly embodied on a program storage unit. Such a software can take the form of a plug-in to be integrated to another software. The application program may be uploaded to, and executed by, an image processing device comprising any suitable architecture. Preferably, the image processing device is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit, a display device, or a printing unit. The image processing device implementing the embodiment of the method according to the invention may be part of any electronic device able to receive images, for instance a TV set, a set-top-box, a gateway, a cell phone, a tablet.

The present invention describes a method for obtaining an expansion exponent map to be applied to an image I of a video sequence.

Figure 1:
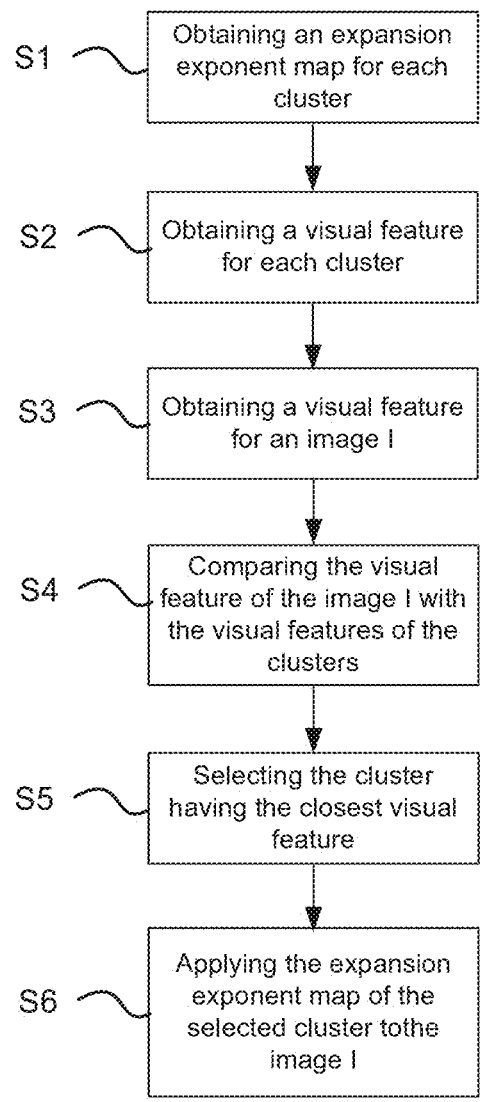
FIG. 1 is a flow chart of a method of inverse tone mapping of an image according to the invention.

FIG. 1 is a flowchart of a method of inverse tone mapping according an embodiment of the invention.

The method comprises a preliminary or training phase for generating expansion exponent maps and visual features for clusters of reference images and a subsequent phase for selecting and applying one of the expansion exponent maps during the training phase to an image I to be processed. The training phase is offset and done only once. And the subsequent phase is performed on the fly on the image I. The training phase and the subsequent phase can be performed in two different apparatus.

The global flow chart comprises six steps S1 to S6. The two first ones, S1 and S2, belong to the training phase and are generally performed offline. The four next steps, S3 to S6, are generally performed on the fly on the image I.

In the first step S1, expansion exponent map data are obtained for a plurality of clusters of reference images. The training phase will be described for three clusters. The reference images of a given cluster are images having expansion exponent maps, called reference expansion exponent maps that are close together according to a predetermined distance criterion. The reference expansion exponent maps are generated for each reference image by colorists by means of a dedicated tool and the close reference expansion exponent maps are put together in a cluster. The clustering operation may be performed by computing a Euclidian distance between the reference expansion exponent maps of each pair of reference expansion exponent maps and putting together, in clusters, close reference expansion exponent maps. The clustering operation may also be performed by using spectral clustering. The number of clusters may be defined by an operator or can be predetermined.

Figure 2:
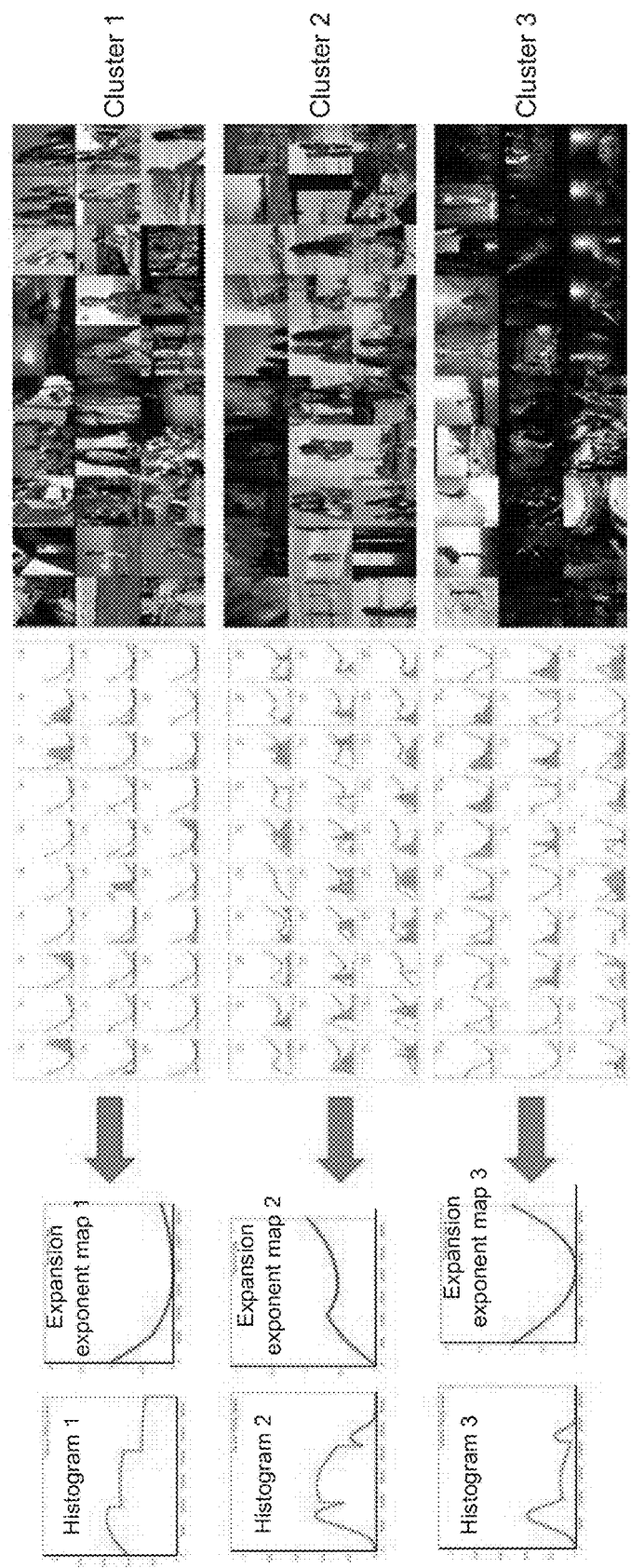
FIG. 2 illustrates the generation of expansion exponent maps and visual features for clusters of reference images according to an embodiment of the invention.

So, a single expansion exponent map is computed for each cluster based on the reference expansion exponent maps of the reference images of the cluster. This step is illustrated by FIG. 2. In this figure, there are 3 clusters, each comprising 30 reference images. A function representing an expansion exponent map is generated, for each cluster, based on the 30 reference expansion exponent maps of the reference images of the cluster.

In a specific embodiment, each reference expansion exponent map of a reference image is represented by a quadratic function of luminance or of low-filtered luminance. This quadratic function is for example defined by the relation:

$$E(p) = a[Y_{base}(p)]^2 + b[Y_{base}(p)] + c$$

where: $Y_{base}(p)$ is a low-filtered luminance value of a pixel p of an image and a, b, and c are the parameters defining the quadratic function.

This quadratic function is described in detail in the patent application WO 2015/096955 mentioned in the background part of the present description.

Having defined as explained above a function of luminance or of low-filtered luminance representing a reference expansion exponent map for each reference image of a cluster, the parameters of a function representing an expansion exponent map associated to this cluster are obtained by:
  obtaining the quadratic function parameters defining the quadratic function representing the expansion exponent map of each reference image of the cluster,
  sorting these quadratic function parameters in ascending or descending order, and
  selecting the median values of the sorted quadratic function parameters as parameters of the quadratic function of luminance or of low-filtered luminance, this function representing the expansion exponent map of the cluster.

In the example of FIG. 2, these functions are each defined by 3 parameters: a, b and c, which means 30 parameters a, 30 parameters b and 30 parameters c for one cluster. These parameters are sorted in ascending or descending order and the median value for each parameter ($a_{median}$, $b_{median}$, $c_{median}$) is selected as the parameters defining a function representing an expansion exponent map for a cluster. These parameters form "expansion exponent map data" of this cluster.

In the same manner, in the step S2, a visual feature is computed for each cluster based on the 30 visual features of the reference images of the cluster. This visual feature of a reference image is a feature representative of the luminance of the different reference images of the cluster. The visual feature of a reference image is for example the histogram of the luminance levels of the pixels of said reference image or image.

In a preferred embodiment, the visual feature of a reference image (as of the image to inverse tone map: see below) comprises only Gaussian function parameters defining Gaussian functions approximating the histogram of the luminance levels of the pixels of the reference image (as of the image to inverse tone map). In this embodiment, the luminance range of the image is divided in at least three consecutive luminance portions that correspond to shadows values, midtones values and highlights values. The size of these portions can be equal or not. For each of these three luminance range portions, the histogram is approximated by a Gaussian Function G(x) defined by three parameters P0, P1 and P2:

$$G(x) = P0 \cdot e^{-\frac{1}{2}\left(\frac{x-P1}{P2}\right)^2}$$

where P0 is a constant value, P1 is the mean value and P2 is the standard deviation.

Thus, in this embodiment, the visual feature of an image comprises only three parameters (P0, P1, P2) for each of the three luminance range portions, that means 9 parameters in total. These parameters are designated by:
  $P0_S$, $P1_S$, $P2_S$ for the first luminance range portion (shadows),
  $P0_M$, $P1_M$, $P2_M$ for the second luminance range portion (midtones), and
  $P0_H$, $P1_H$, $P2_H$ for the third luminance range portion (highlights).

Thus, 9 parameters are generated for each reference image of the clusters.

As for the expansion exponent maps, the 9 parameters ($P0_S$, $P1_S$, $P2_S$, $P0_M$, $P1_M$, $P2_M$, $P0_M$, $P1_M$, $P2_M$) of the reference images of each cluster are sorted in ascending or descending order and the median values of each parameter is selected as a parameter for the cluster.

In the example of FIG. 2, as each cluster comprises 30 reference images, the 30 parameters $P0_S$ of the 30 reference images of the cluster are sorted and the median value $P0_{S\_median}$ is selected as parameter $P0_S$ for the visual feature of the cluster. The same sorting and selecting operations are executed for the others parameters ($P1_S$, $P2_S$, $P0_M$, $P1_M$, $P2_M$, $P0_M$, $P1_M$, $P2_M$) so that 9 parameters ($P0_{S\_median}$, $P1_{S\_median}$, $P2_{S\_median}$, $P0_{M\_median}$, $P1_{M\_median}$, $P2_{M\_median}$, $P0_{M\_median}$, $P1_{M\_median}$, $P2_{M\_median}$) are obtained as visual feature for the cluster.

As these steps are performed offline, the resulting functions representing expansion exponent maps of the different clusters and visual features of these clusters are stored in a memory. For each cluster, 3 parameters a, b and c are stored for representing the expansion exponent map and 9 parameters are stored for the visual feature.

When the steps S1 and S2 of the training phase are performed in an apparatus different from the apparatus performing the subsequent phase, the apparatus performing the subsequent phase is configured to store expansion exponent map data and visual feature for each cluster of reference images.

By referring again to FIG. 1, the next steps S3-S6 of the subsequent phase are performed on the fly on an image I to be expanded.

In the step S3, a visual feature for the image I is obtained as described above for the reference images. This visual feature is generated by a pre-processor. As described herein above, the visual feature of the image preferably only 9 parameters: $P0_S$, $P1_S$, $P2_S$, $P0_M$, $P1_M$, $P2_M$, $P0_H$, $P1_H$, $P2_H$ defining 3 Gaussian functions in three predefined luminance range portions.

In the step S4, the visual feature of the image I is compared with the visual features of the clusters of reference images according to a distance criterion. For example, a Euclidean distance between the parameters of the visual feature of the image I and the parameters of the visual feature of each one of the clusters.

In the step S5, the cluster, the visual feature of which is the closest (minimum distance) to the visual feature of the image I is selected.

In the step S6, the 3 parameters a, b and c of the selected cluster are used to compute an expansion exponent map for the image, and this expansion exponent map is then applied to inverse tone map colors of pixels of the image I, notably as in the document WO2015/096955 already quoted.

Figure 3:
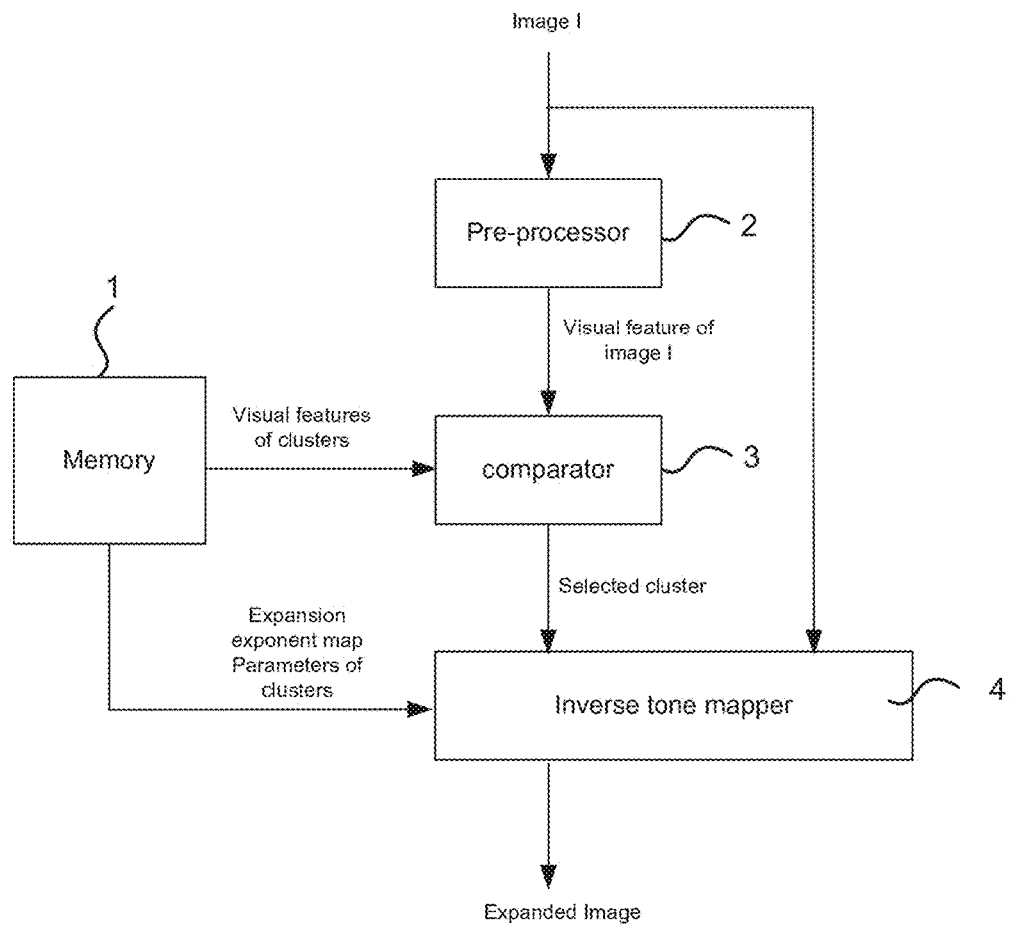
FIG. 3 is a block diagram of an image processing device according to an embodiment of the invention.

FIG. 3 is a block diagram of an image processing device for executing on the fly the steps S3 to S6 on an image I or a video sequence comprising the image I.

The image processing device comprises a memory 1, a pre-processor 2, a comparator 3 and an inverse tone mapper 4.

The memory 1 stores, for each one of the clusters of reference images, expansion exponent map data and a visual feature, representative of the luminance of reference images of the cluster. These data are generated offline in the steps S1 and S2 by the present image processing device or by another different device.

The pre-processor 2 receives the image I and implements the step S3 in order to generate a visual feature for the image I.

The comparator 3 compares the visual feature of the image I with the visual features of the clusters as defined in step S4 and selects the cluster, the visual feature of which is the closest or best matches to the visual feature of the image I as defined in step S5.

The inverse tone mapper 4 applies the expansion exponent map computed using a function defined by expansion exponent map data of the selected cluster to the image I as defined in step S6, i.e. by parameters a, b and c defining a quadratic function.

When the inverse tone mapping is to be applied to a video sequence comprising a plurality of video shots, the same quadratic function—defined by the same parameters a, b and c of a cluster—may be used to compute the expansion exponent maps that will be applied to all the images of a same video shot. The video shots of the video sequence are identified by detecting the cuts in the video sequence. One image I is selected in the video shot. The steps S3 to S6 are executed for the image I and, at the end of the process, the same quadratic function of the selected cluster is used to compute the expansion exponent maps that are applied to the whole video shot comprising the image I. The image I can be the first image of the video shot or the $n^{th}$ image of the video shot.

In that case, the image processing device further comprises a cut detection circuit for obtaining the video shots of the video sequence and a selector for selecting one image in each video shot.

It can be noted that clusters of reference images can be generated for different categories of video content. For example, some clusters are generated for sport. Other clusters are generated for talk show, for series . . . . In that case, the image processing can consult the electronic program guide (EPG) to determine the category of the current video sequence and selects the clusters of this category. The steps S3-S6 are then executed only for the clusters of this category.

While example embodiments are capable of various modifications and alternative forms, embodiments thereof are shown by way of example in the drawings and will herein be described in details. It should be understood, however, that there is no intent to limit example embodiments to the particular forms disclosed, but on the contrary, example embodiments are to cover all modifications, equivalents, and alternatives falling within the scope of the claims.

The invention claimed is:

1. A method for inverse tone mapping of an image, comprising the steps of:
    obtaining a visual feature for said image representative of luminance of said image,
    comparing the visual feature of said image with visual features of at least two clusters of reference images according to a distance criterion, wherein the visual feature of a cluster is representative of the luminance of reference images of this cluster,
    selecting, among said at least two clusters, the cluster, the visual feature of which is the closest to the visual feature of said image, and
    inverse tone mapping said image by applying an expansion exponent map to said image, wherein said expansion exponent map is computed for said image based on expansion exponent map data of the selected cluster,
    wherein said expansion exponent map is represented by a quadratic function of luminance defined by the relation:

$$E(p)=a[Y_{base}(p)]^2+b[Y_{base}(p)]+c$$

where: Ybase (p) is a low-pass filtered luminance value of a pixel p of an image and a, b, and c are the parameters of the quadratic function.

2. The method according to claim 1, wherein the visual feature of said image comprises a histogram of luminance levels of pixels of said image.

3. The method according to claim 2, wherein, a luminance range of said image being divided in at least three consecutive luminance portions, the visual feature of said image comprises Gaussian function parameters defining a Gaussian function for each of said at least three consecutive luminance portions, approximating the histogram of the luminance levels of the pixels of said image in said luminance portion.

4. A method for generating expansion exponent map data and visual feature for each one of at least two clusters of reference images to be used to implement the method of claim 1, comprising obtaining, for each of said at least two clusters:
  parameters defining a function representative of an expansion exponent map for this cluster, and
  a visual feature representative of the luminance of reference images of the cluster.

5. The method according to claim 4, wherein the visual feature of said cluster comprises a histogram of luminance levels.

6. The method according to claim 5, wherein a luminance range of reference images of said cluster is divided in at least three consecutive luminance portions, further comprising obtaining a visual feature for each of said reference images, wherein said visual feature comprises Gaussian function parameters defining a Gaussian function for each of said at least three consecutive luminance portions, approximating an histogram of luminance levels of the pixels of said reference image in said luminance portion.

7. The method according to claim 6, wherein the Gaussian function parameters of the visual feature of said cluster are obtained by selecting median values of the Gaussian function parameters of all reference images of said cluster as parameters of the Gaussian function of the visual feature of the cluster.

8. The method according to claim 4, wherein the function representative of an expansion exponent map for this cluster is defined by parameters associated with a quadratic function.

9. The method according to claim 8, wherein the quadratic function parameters of a cluster are obtained by:
  obtaining quadratic function parameters defining a function representative of an expansion exponent map for each reference image of the cluster, and
  selecting median values of the quadratic function parameters of all reference image of the cluster as parameters of the quadratic function defining a function representative of an expansion exponent map for the cluster.

10. An image processing device comprising:
  a memory for storing, for each one of at least two clusters of reference images, expansion exponent map data and a feature, called visual feature, representative of the luminance of reference images of the cluster,
  a pre-processor that obtains an image and a visual feature for said image, which is representative of luminance of said image,
  a comparator for comparing the visual feature of said image with the visual features of said at least two clusters according to a distance criterion, and for selecting, among said at least two clusters, the cluster, the visual feature of which is the closest to the visual feature of said image,
  an inverse tone mapper for applying an expansion exponent map to said image, wherein said expansion exponent map is computed for said image based on a function defined by expansion exponent map data of the selected cluster,
  wherein the expansion exponent map is defined by parameters associated with a quadratic function defined by the relation:

$E(p) = a[Y_{base}(p)]^2 + b[Y_{base}(p)] + c$ where: $Y_{base}(p)$ is a low-pass filtered luminance value of a pixel p of an image and a, b, and c are the parameters of the quadratic function.

11. The image processing device according to claim 10, wherein the visual feature of an image comprises the histogram of the luminance levels of the pixels of said image and wherein the comparator compares the histogram of the image with the histograms of the clusters.

12. The Image processing device according to claim 10, wherein, a luminance range of an image being divided in at least three consecutive luminance portions, the visual feature of said image comprises Gaussian function parameters defining at least three Gaussian functions approximating thea histogram of the luminance levels of the pixels of said image in said at least three consecutive luminance portions respectively.

13. The image processing device according to claim 10, wherein the pre-processor is adapted to obtain a video sequence comprising a plurality of video shots, each video shot comprising at least one image and wherein the image processing device preferably further comprises:
  a cut detection circuit for detecting cuts between shots of the video sequence,
  a selector for selecting one image in at least one shot of the video sequence,
  said selected image being used by the pre-processor, the comparator and the first selector for selecting, among said at least two clusters, the cluster, the expansion exponent map of which is to be applied by the inverse tone mapper to the images of the at least one shot to which said selected image belongs.

14. An electronic device comprising an image processing device according to claim 10.

15. The electronic device according to claim 14, selected in the group formed by a TV set, a set-top-box, a gateway, a cell phone and a tablet.

* * * * *